Sept. 23, 1930.  C. FARROW  1,776,253
SIGN DISPLAYING APPARATUS
Filed May 21, 1928   2 Sheets-Sheet 1
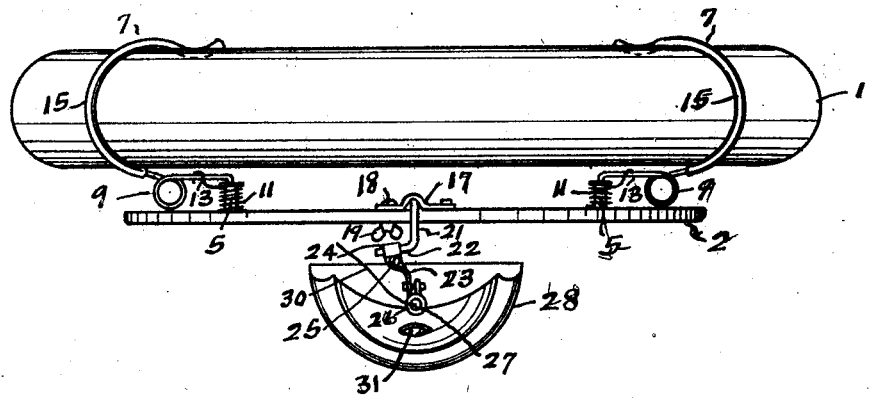
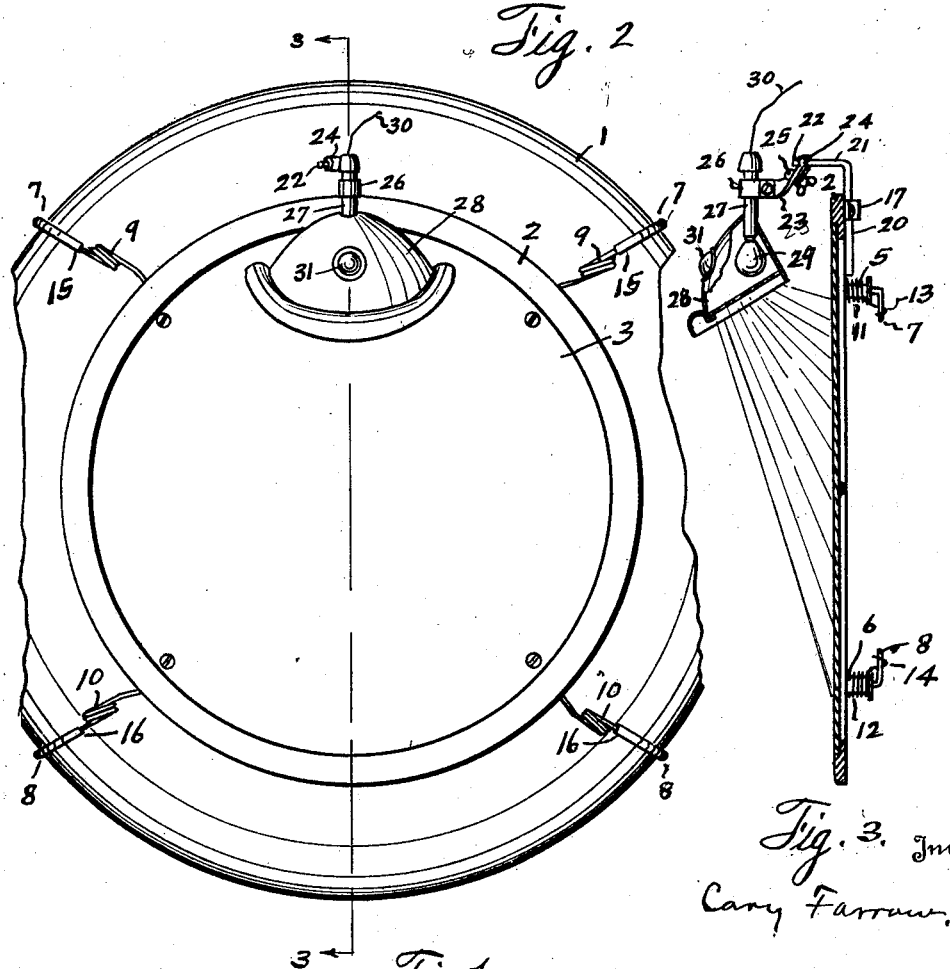

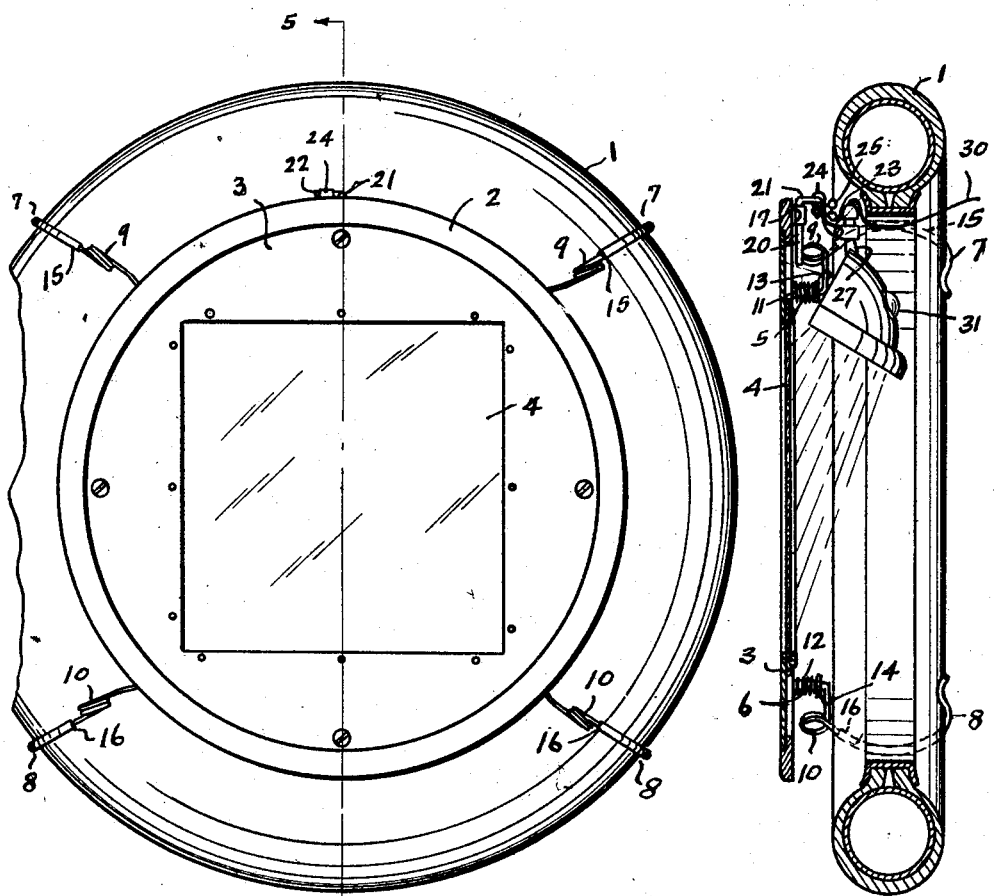

Patented Sept. 23, 1930

1,776,253

UNITED STATES PATENT OFFICE

CARY FARROW, OF HOUSTON, TEXAS

SIGN-DISPLAYING APPARATUS

Application filed May 21, 1928. Serial No. 279,263.

This invention relates to new and useful improvements in a sign displaying device.

One object of the invention is to provide a sign or advertisement displaying device specially designed for application to a spare tire, carried on a motor vehicle, and adapted to utilize said tire as an anchor for attaching the device to such vehicle.

Another object of the invention is to provide a device of the character described which may readily be attached to and detached from the ordinary spare tire usually carried by a motor vehicle, and the invention further comprehends means for the attachment thereto of an electric light which will render the display visible at night.

With the above and other objects in view this invention has particular relation to certain novel features of construction, operation, and arrangement of parts an example of which is given in this specification and illustrated in the accompanying drawings, wherein:—

Figure 1 shows a rear elevation of the device as applied to a spare tire to be mounted on a motor vehicle.

Figure 2 shows a plan view thereof.

Figure 3 shows a vertical sectional view taken on the line 3—3 of Figure 1.

Figure 4 shows a rear elevation of another form of the device and

Figure 5 shows a vertical sectional view thereof taken on the line 5—5 of Figure 4.

Referring now more particularly to the drawings, wherein like numerals of reference designate similar parts in each of the figures the numeral 1 designates a conventional pneumatic tire adapted for use on a motor vehicle. The sign displaying device will usually be applied to said tire when carried as a spare tire on the vehicle.

The numeral 2 designates an annular rim, forming a frame and to which the disc 3 is attached. This disc may be of opaque material, as shown in Figures 1, 2 and 3, or it may include a translucid panel, as 4, as shown in Figures 4 and 5. In case an opaque disc is employed the advertising matter to be displayed will be printed or painted on the outside thereof. In case the translucid panel 4 is employed the matter to be displayed may be carried on said panel in opaque characters. Fastened to the rim are the inwardly extending upper and lower bearings 5, 5 and 6, 6, respectively. There are the arcuate upper and lower spring clamps 7, 7 and 8, 8, adapted to clamp around the tire 1, and these clamps are formed into the helical springs 9, 9 and 10, 10 intermediate their ends and their outer ends are outwardly turned and fitted into the respective bearings 5 and 6. Coil springs 11, 11 and 12, 12 respectively, surround the bearings 5 and 6 with their ends adjacent the rim 2, attached to said rim and their other ends are formed into hooks 13, 13 and 14, 14 which engage over the corresponding clamps 7 and 8. The outer or arcuate portions of the clamps 7, 8 may have rubber tubes 15, 15 and 16, 16 respectively, fitted thereover so that they will not injure the tire.

In applying the device to the tire the upper clamps 7 may be engaged over the tire and the lower clamps 8, 8 may be then moved toward each other and swung outwardly, the spring sections 10 yielding to permit the outward movement of said clamps 8, and then engaged over the tire and when released the springs 11 and 12 will operate to hold said clamps against the tire and will hold the device securely in place; or in applying the device the lower clamps 8 may be first engaged over the tire and the upper clamps 7 then moved toward each other and then swung outwardly as above explained and then engaged over the tire.

Fastened to the inner side of the rim 2, preferably at the top, there is a bracket 17, one end of which is secured in place by means of the bolt 18 and wing nut 19, and an upstanding anchor rod 20 clamped between this bracket and the rim 2. The upper end of this rod 2 is overturned into horizontal position with its free end 22 bent over at right angles to said overturned portion. A clamp 23 has one end formed with a bearing 24 which receives the overturned end 22 and is clamped thereon by means of the clamp bolt 25 and the other end of the clamp 23 is formed into a clamp bearing 26, disposed at right angles to the bearing 23 and which receives and clamps the stem 27, to which the light housing 28 is attached. The inner end of the stem 27 has the usual lamp socket to receive the electric globe 29, which is connected with the electric wiring 30 which passes through said stem.

In case the opaque disc 3 is employed the light will be adjusted so as to throw the rays of light directly onto the outer side of the disc and onto the advertisement thereon. In case the disc, having the translucid panel 4, is employed the light should be adjusted to the inner side of the device so as to throw the rays of light against the inner side of the panel 4 to reveal the opaque advertising matter thereon, as shown in Figures 4 and 5. In making this adjustment the bolts 18 and 25 may be loosened to permit the adjustment and then again tightened to secure the light in place.

The housing 28 has a red lens 31 which serves as a rear warning signal when the housing is adjusted to throw the light onto the outer side of the disc.

I have shown what I now consider the preferred forms of the invention but it is obvious that mechanical changes may be made therein and equivalents substituted for the parts shown and I reserve the right to make such mechanical changes and substitutions as may be comprehended within the scope of the appended claims.

What I claim is:—

1. A sign displaying device including an annular frame, a sign displaying surface mounted in the frame, inwardly extending upper and lower bearings carried by the frame, arcuate upper and lower spring clamps shaped to clamp around a pneumatic tire, and whose outer ends are outwardly turned and fitted into the respective upper and lower bearings, coil springs around said bearings, the end of each spring adjacent said frame being attached to the frame and their other ends being attached to the corresponding clamps.

2. A sign displaying device including an annular frame, a sign displaying surface mounted in the frame, inwardly extending upper and lower bearings carried by the frame, arcuate upper and lower spring clamps shaped to clamp around a pneumatic tire, and whose outer ends are outwardly turned and fitted into the respective upper and lower bearings, coil springs around said bearings, the end of each spring adjacent said frame being attached to the frame and their other ends being attached to the corresponding clamps, and sleeves of yieldable material fitted over the respective clamps.

In testimony whereof I have signed my name to this specification.

CARY FARROW.